United States Patent [19]

Graaf et al.

[11] 4,260,324
[45] Apr. 7, 1981

[54] CAM-ACTUATED SWING TURNOVER AND TRANSFER PLACING APPARATUS

[75] Inventors: Max V. Graaf, Glenview; Josef Mang, Palos Hills, both of Ill.

[73] Assignee: Emerson Electric Co., St. Louis, Mo.

[21] Appl. No.: 29,064

[22] Filed: Apr. 11, 1979

[51] Int. Cl.³ .............................................. B65G 47/86
[52] U.S. Cl. ..................................... 414/735; 414/736; 414/744 A
[58] Field of Search ............... 414/730, 735, 736, 738, 414/744 R, 744 A

[56] References Cited

U.S. PATENT DOCUMENTS

| | | |
|---|---|---|
| 2,776,764 | 1/1957 | Palmleaf . |
| 2,904,192 | 9/1959 | Reynolds et al. . |
| 2,927,365 | 3/1960 | May . |
| 2,986,949 | 6/1961 | Lancaster et al. ................. 74/567 X |
| 2,997,186 | 8/1961 | Terez . |
| 3,039,497 | 6/1962 | Hamilton et al. . |
| 3,049,017 | 8/1962 | McDonald et al. ................. 74/426 X |
| 3,252,588 | 5/1966 | Altenburger ......................... 414/736 |
| 3,525,268 | 8/1970 | Kenny ..................................... 74/84 |
| 3,692,194 | 9/1972 | Uchiumi et al. . |
| 3,784,031 | 1/1974 | Niitu et al. . |
| 3,975,817 | 8/1976 | Frazier . |
| 3,999,664 | 12/1976 | Frazier . |
| 4,015,721 | 4/1977 | Scheler . |
| 4,076,131 | 2/1978 | Dahlstrom et al. . |
| 4,113,115 | 9/1978 | Yoshio . |

OTHER PUBLICATIONS 3,951,271 04001976 Mette

Primary Examiner—Leslie J. Paperner
Attorney, Agent, or Firm—McCaleb, Lucas & Brugman

[57] ABSTRACT

An automatic, cam-actuated precision transfer apparatus operable to transfer and simultaneously invert workpieces between adjacent work stations. The transfer apparatus utilizes a common input shaft to provide input rotation to both a stationary oscillator device as well as an indexer device rotatably mounted atop the oscillator. The output of the oscillator device horizontally oscillates the rotatable indexer device through a desired number of degrees of rotation, and the indexer's output vertically indexes a turret-type transfer arm assembly which has associated pick and place units. The combined indexing and oscillating movements produced by the transfer apparatus allow a workpiece to be picked up at a first work station, vertically inverted while being horizontally transferred, and finally deposited at a second work station. The transfer apparatus is adjustable to accommodate any variations in manufacturing setups.

9 Claims, 9 Drawing Figures

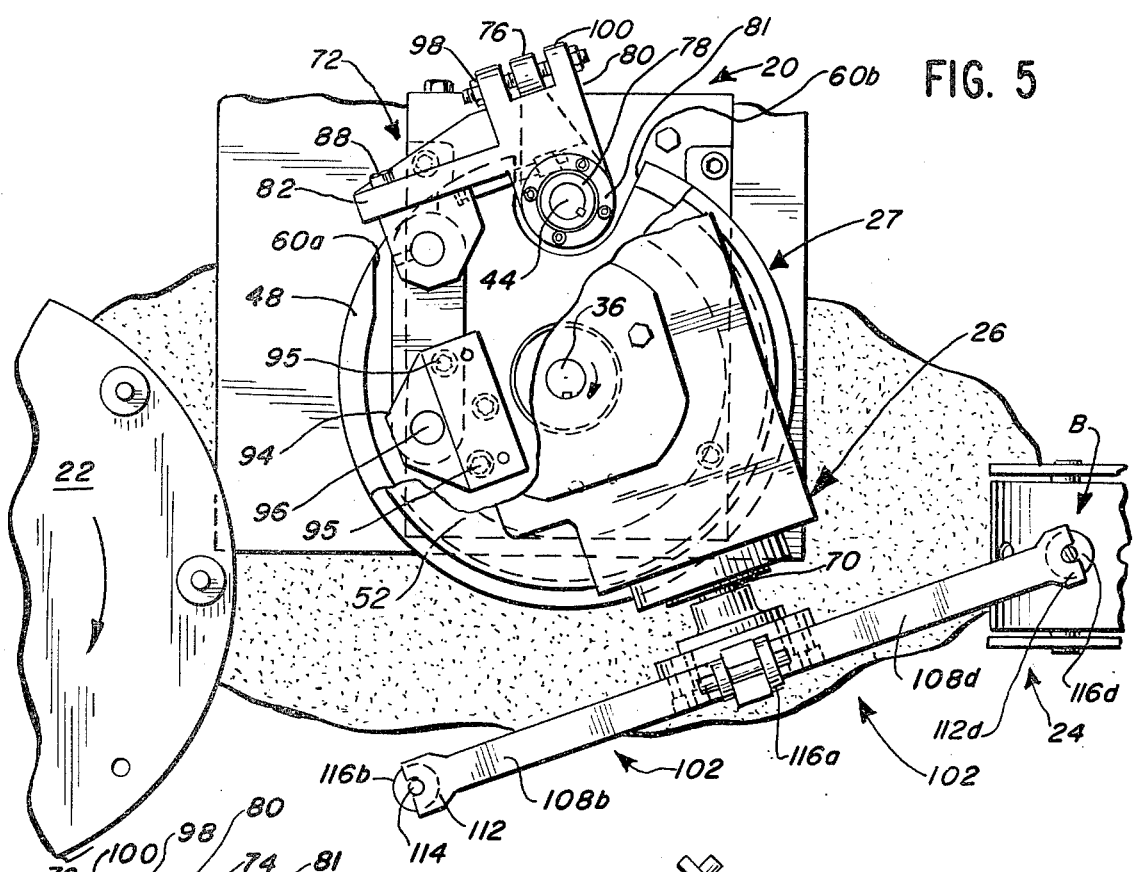
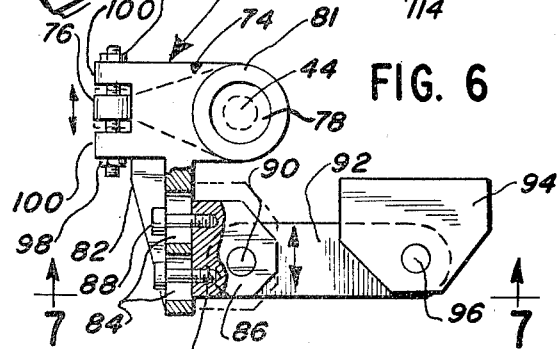
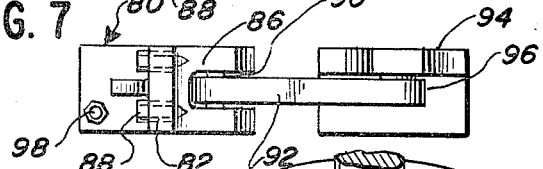
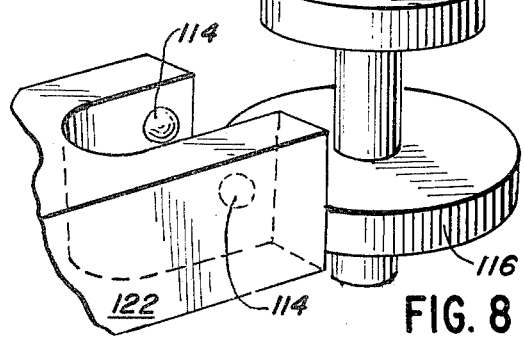
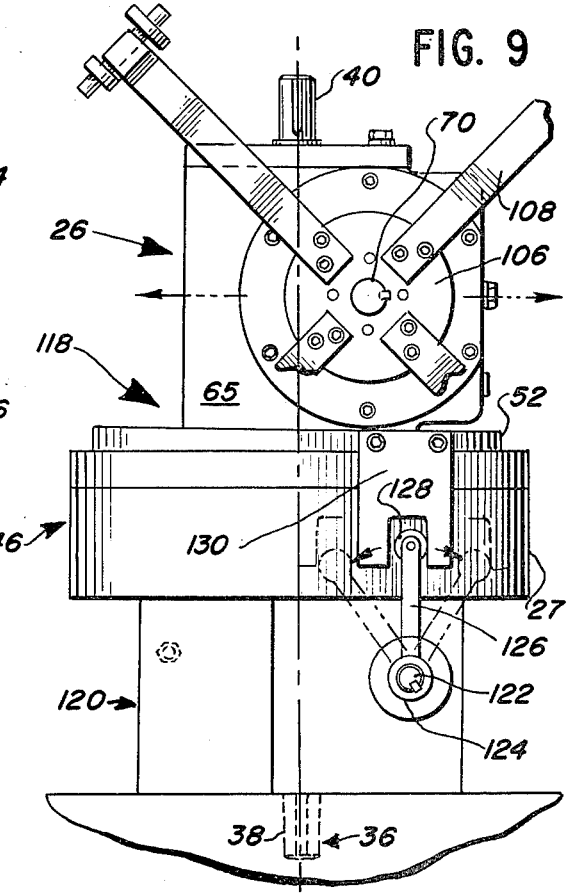

CAM-ACTUATED SWING TURNOVER AND TRANSFER PLACING APPARATUS

BACKGROUND OF THE INVENTION

1. Field of the Invention

This invention relates to automatic parts handling apparatus, and more particularly to transfer assembly devices operable to invert a workpiece during its transfer between work stations.

2. Description of Prior Art

There is a need for improved assembly transfer apparatus which are capable of accurately picking up and placing workpieces at designated locations. Such apparatus are needed in manufacturing and assembly operations where workpieces are consecutively operated on at various work stations and must be transferred therebetween. Additionally, the workpieces may be required to be inverted or otherwise rotatably aligned during transfer between work stations. The use of such transfer devices is not new. Various prior art devices had such transfer capabilities but required primary and secondary transfer devices operating in tandem to complete a transfer. Still other devices required pre-programming of their control elements to achieve a continuous transfer activity, or were complex structurally, or even required auxiliary extending type pick-up units to complete their transfer and placing actions. Many prior art parts handler devices were slow in operation and incapable of the rapid mass movement of workpieces required in highly automated assembly operations. Other prior art devices utilized complicated linkage systems and exposed cam arrangements that had heavy and slow moving parts. Some prior art devices, where one shaft underwent both rotational and axially sliding movement to effect an arcuate transfer of a workpiece, had the undesirable problem of ineffective sealing about the rotating and sliding output shaft.

Examples of workpiece transfer devices, industrial robots and other mechanical manipulators typifying the prior art are: U.S. Pat. Nos. 2,904,192; 2,927,365; 2,997,186; 3,692,194; 3,951,271 and 4,113,115.

SUMMARY OF THE INVENTION

The present invention is a cam-actuated workpiece transfer and turnover device utilizing a constant speed input shaft. The input shaft is common to both an oscillator, which provides a horizontally reciprocating transfer action, and a rotatable indexer, which provides a vertically rotating indexing action. Four transfer arms having associated pick and place members are mounted on the output of the indexer and, through their vertical rotational indexing, operate to pick up a workpiece at a first work station, vertically rotate it to an inverted position, and subsequently place it in a second, spatially-removed work station. The horizontal oscillation of the transfer arm axis, caused by the oscillation of the indexer mechanism which is rotatably mounted atop the oscillator device, causes a "picked" workpiece to be horizontally transferred or swung through an arc from one work station to another.

The preferred embodiment of the present invention utilizes a stationary, parallel shaft type of oscillator device. Its vertically-aligned output shaft, which oscillates through a desired amount of rotation, drives a right angle type indexer mechanism which is rotatably mounted atop it. A linkage assembly is utilized between the output shaft of the oscillator and the mounting plate base of the rotatably-mounted indexer mechanism to transfer the horizontal oscillation movement to the indexer. The linkage assembly is adjustable to provide the necessary adjustments as to timing and stroke for the transfer apparatus.

An alternate embodiment of the present invention utilizes a so-called right angle type oscillator device. A downwardly extending yoke is mounted at one end to the rotating indexer device and at the other end over an upstanding lever connected to the oscillating side output shaft of the oscillator. The same ultimate turnover and transfer action for a workpiece is obtained with this alternate form.

The present invention's transfer apparatus is significantly compact compared to prior art systems; it utilizes smaller and less costly components. The use of enclosed box cams rather than exposed cam arrangements produces a dependable transfer assembly having a fairly predictable life span. It has a minimal number of moving parts, principally because of the use of a common input shaft for the vertically aligned, cam-actuated oscillator and indexer devices. Moreover, because of the use of an indexer device which is horizontally oscillated so as to be in close proximity to the respective work stations, a very small radius arm can be used on the transfer arms which are mounted on the indexer. This use of relatively short transfer arms produces rather low forces of momentum on the respective piece parts during their transfer, and thus, the transfer of very delicate workpieces can be accommodated. The present invention's transfer system is significantly faster than prior art devices and has significant advantages in accuracy.

It is a primary object of the present invention to provide a compact transfer apparatus which is capable of both horizontally transferring a workpiece a desired distance while simultaneously inverting it.

It is another primary object of the present invention to utilize a common input shaft for a workpiece transfer apparatus having multiple cam-actuated components.

It is still another object of the present invention to provide a transfer apparatus capable of rapidly and accurately transferring delicate workpieces between work stations without fear of damage due to undesirably large momentum forces.

It is yet another object of the present invention to provide a transfer apparatus having stroke and phase adjustment capabilities.

The means by which the foregoing and other objects of the present invention are accomplished and the manner of their accomplishment will be readily understood from the following specification upon reference to the accompanying drawings, in which:

FIG. 5 is another plan view similar to FIG. 3, but showing the apparatus as it would appear during the "placing" portion of an operating cycle;

FIG. 6 is a plan view of the adjustable linkage assembly of the transfer apparatus of the present invention;

FIG. 7 is an elevation of the linkage assembly shown in FIG. 6;

FIG. 8 is a perspective view of a workpiece and a portion of a transfer arm and showing certain components in more detail; and FIG. 9 is an elevation view of an alternate embodiment of the present invention.

DESCRIPTION OF THE PREFERRED EMBODIMENT

Figure 1:
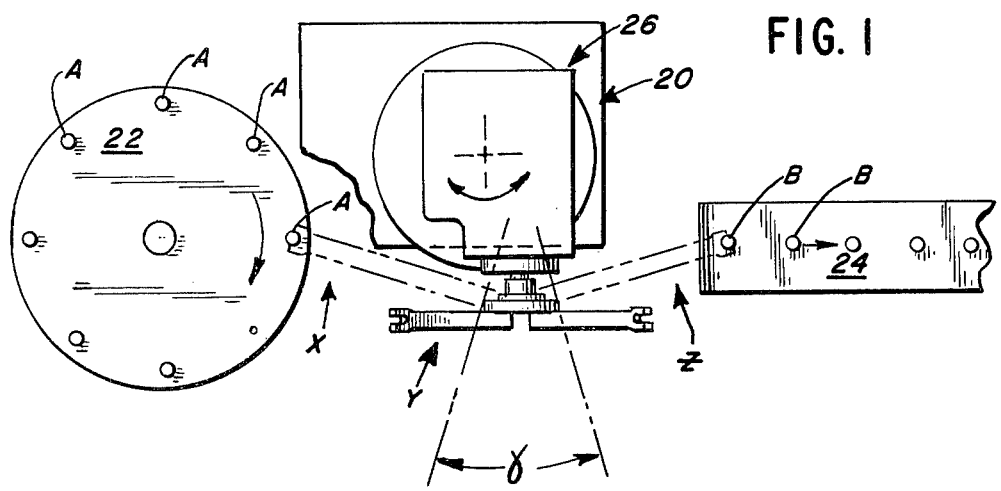
FIG. 1 is an overall plan view showing the environmental layout in which the present invention is operable.
Figure 2:
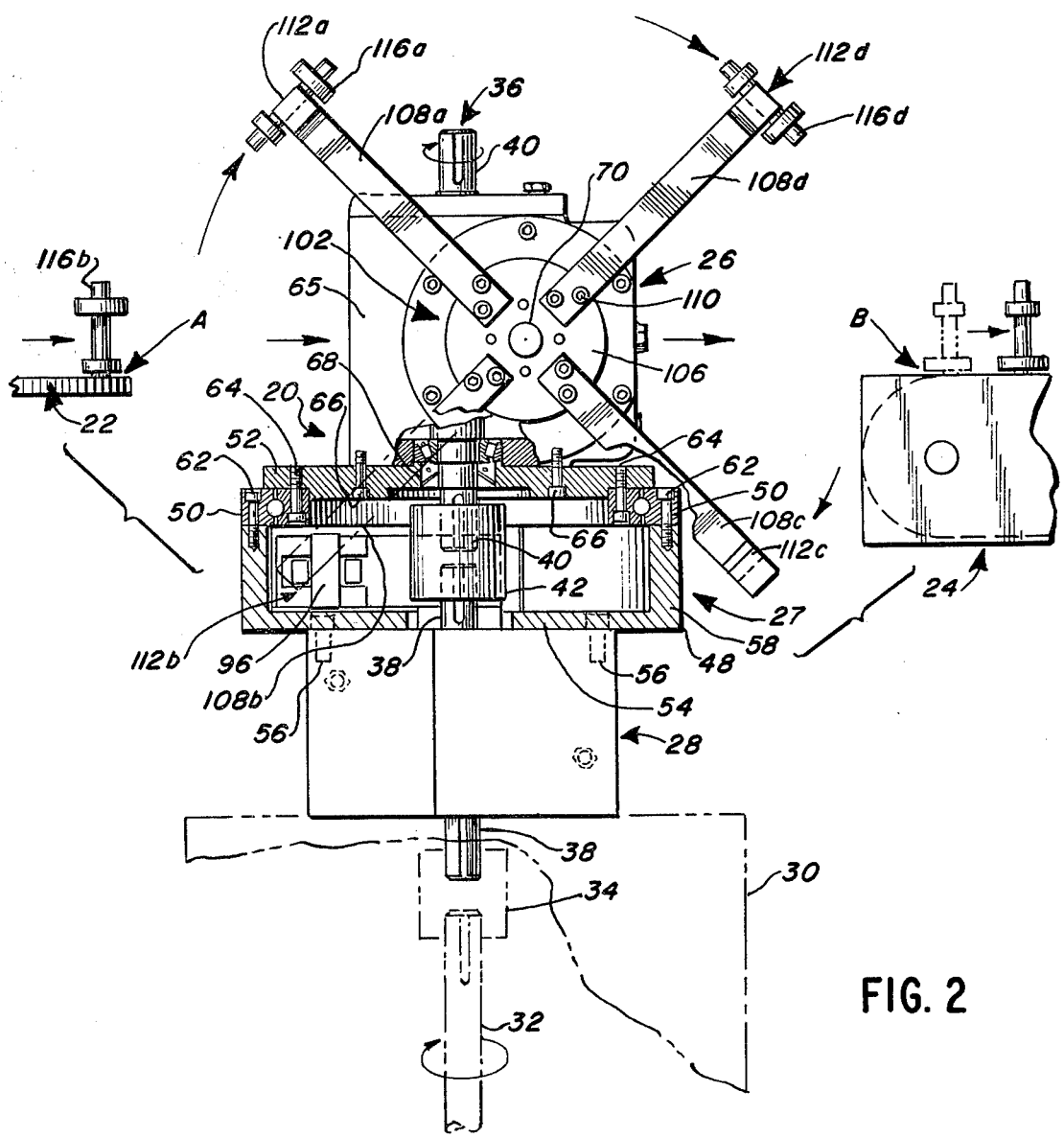
FIG. 2 is an elevation view of the workpiece transfer apparatus of the present invention, and depicting the operational positions of certain components thereof during movement between a "pick-up" and a "placing" position.

Having reference to the drawings, wherein like reference numerals indicate corresponding elements, there is shown in FIG. 1 an illustration of the cam-actuated turnover and placing transfer apparatus of the present invention, generally noted by reference numeral 20. Transfer apparatus 20 is there depicted in a typical parts assembly setting including a rotating, multiple station, assembly dial plate 22 from which piece parts are picked up at respective work station A, and an endless conveyor track 24 where the transferred workpieces are deposited, such as at work station B. As seen in FIG. 2, the transfer apparatus 20 is comprised generally of an upper portion or indexer drive device 26, an adapter unit 27, and a lower portion or oscillator drive device 28 which is mounted to a transfer support column 30. The column 30 is in common use and forms no part of this invention.

Supported internally of transfer column 30 is a motor-driven, constant speed drive shaft 32 which, via a shaft coupler 34, drives main input shaft 36. The main shaft 36 is common to both the indexer 26 and oscillator 28 and comprises a lower shaft portion 38 and an upper shaft portion 40 which are solidly coupled together by a second coupler 42. The main shaft 36 rotates in the direction of the arrows shown in FIGS. 2 and 3. (It will be understood that for ease of assembly the main shaft 36 of the preferred embodiment comprises two sections, however, a drive shaft of unitary construction could be used.)

Figure 3:
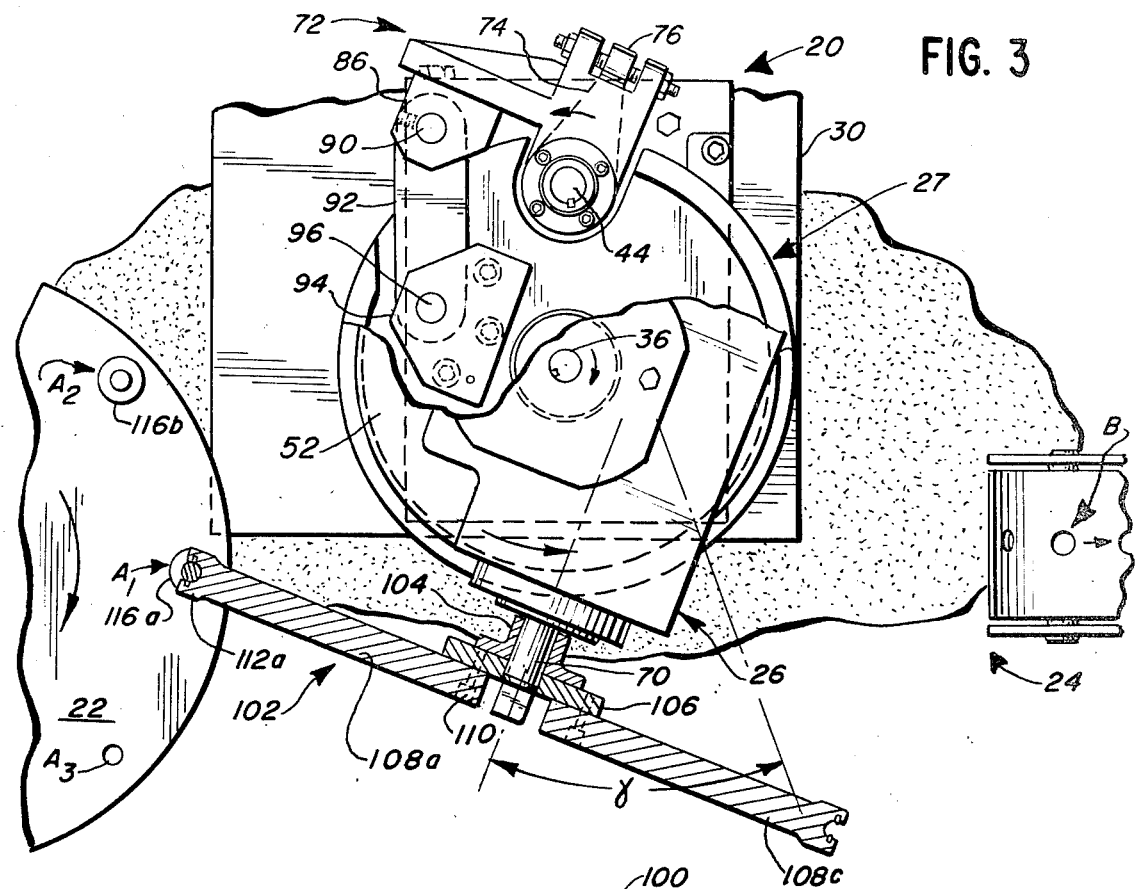
FIG. 3 is a plan view of the transfer apparatus shown in FIG. 2, and depicting the location of certain components during the "pick-up" portion of an operating cycle.
Figure 4:
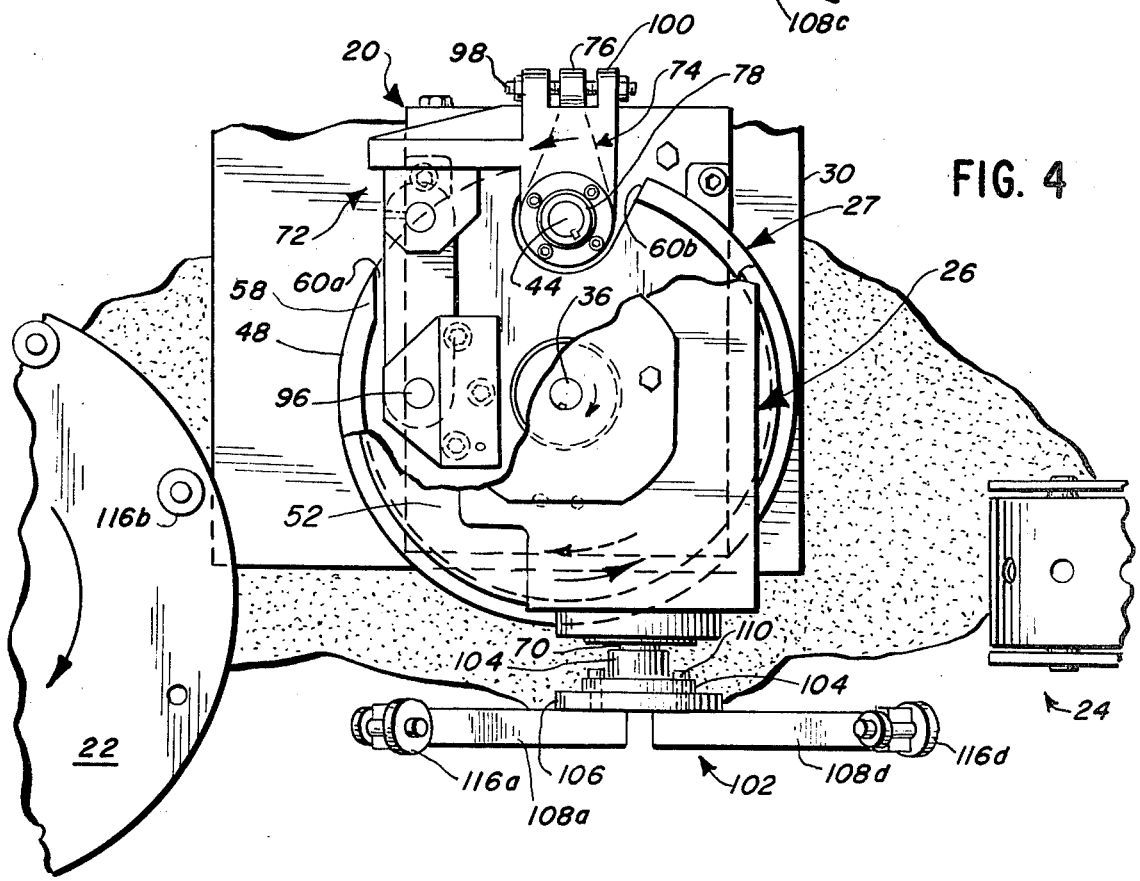
FIG. 4 is another plan view of the apparatus, similar to FIG. 3, but depicting the components as they would appear in the intermediate operational position shown in FIG. 2.

The first drive means or oscillator drive device 28 utilized in the preferred embodiment is a parallel shaft type of pre-loaded, enclosed box cam mechanism having an oscillating output shaft 44 aligned parallel to the input shaft 38 (FIGS. 3, 4 & 5). Prior art devices typifying the oscillator device 28 are described in U.S. Pat. Nos. 2,986,949 and 3,525,268, both assigned to the assignor of the present invention. For example, the base portion 11, cover 12, input shaft 18, conjugate cam 28, cam follower wheel 35, and output shaft 19 of U.S. Pat. No. 3,525,268 may be satisfactorily used for the oscillator drive device 28 of the present invention. In any event, the specific cam (not shown) used in oscillator 28 is designed in a well known manner so that the oscillator output shaft 44 oscillates back and forth through a desired degree of rotation, chosen here as a general reference angle $\gamma$ (see FIG. 1).

Mounted atop the oscillator 28 is the adapter unit 27 comprising an adapter spacer housing 48, a four point bearing 50 used to provide the desired rigidity, and a mounting plate 52. The spacer housing 48 is an integral unit formed of a lower plate 54 which is rigidly mounted to the oscillator 28 by threaded fasteners 56 and an upstanding side wall portion 58 of uniform thickness and cylindrical shape. Side wall 58 is interrupted at edge walls 60a and 60b (FIGS. 4 & 5). The bearing 50 is fastened at various locations to the spacer side wall 58 by fasteners 62 while the mounting plate 52 is similarly fastened to the bearing 50 by fasteners 64. Accordingly, the mounting plate 52 is allowed to rotate relative to the stationary oscillator 28 and spacer housing 48. The shaft coupler 42 is situated between lower plate 54 and mounting plate 52.

A base frame 65 of indexer mechanism 26 is mounted to the rotatable mounting plate 52 by fasteners 66 and is capable of horizontally rotating along with plate 52 relative to spacer housing 48 and oscillator 28. A shaft seal 68 seals the upper input shaft portion 40 as it passes through mounting plate 52. The second drive means or indexer drive device 26 of the preferred embodiment is of the well known right angle type of enclosed box cam mechanism, such as described in U.S. Pat. Nos. 2,999,311 and 3,049,017. For example, the housing 10, indexing cam 23, input shaft 24, cam follower plate 17 and cam followers 18, and output shaft 13 of U.S. Pat. No. 3,049,017 may be satisfactorily used for the indexer drive device 26 of the present invention. In any event, the indexer drive 26 has a side output shaft 70 aligned at right angles to shaft 36 which provides constant speed rotational input thereto.

As best seen in FIGS. 2 through 7, an oscillator arm linkage assembly, generally depicted by reference numeral 72, connects the output shaft 44 of oscillator 28 to the rotatable mounting plate 52 and thus to the indexer 26 carried thereby. More particularly, the linkage assembly 72 comprises a pilot member 74 which is keyed to the oscillator output shaft 44, terminates in a finger portion 76, and has an upstanding pilot portion 78. A specially configured oscillator link arm 80 has a mating collar portion 81 pivotally fastened on the pilot portion 78 and also an outwardly extending bracket portion 82 in which slotted adjustment openings 84 (FIG. 6) are formed. A link bracket 86 is fastened via fasteners 88 to bracket portion 82 of link arm 80 and carries a press fit pin 90 to which is pivotally mounted one end of an oscillator link 92. A pivot block 94 is rigidly affixed via fastener 95 to the underneath side of mounting plate 52 at a location within the confines of spacer housing 48. The block 94 carries a press fit pin 96 to which is pivotally mounted the other end of oscillator link 92.

As can be noted in FIG. 6, the adjustment slots 84 on bracket portion 82 of arm 80 allow the fasteners 88 when loosened to be slid therealong until the desired position (the extremes of which are shown in outline in FIG. 6) of link bracket 86 is established, the need for which will be explained later herein. Additionally, the adjusted positioning (shown in outline in FIG. 6) of finger 76 of pilot member 74 is established through use of a pair of threaded stop members 98 carried by respective wing members 100 formed on oscillator link arm 80, which adjustment will also be explained later herein. The above-described linkage assembly 72 thus operates to translate the oscillation (measured by angle $\gamma$) of the output shaft 44 to the mounting plate 52 and ultimately to the entire indexer drive 26.

As best seen in FIGS. 2 through 5, a vertically-aligned turret-type transfer arm assembly, generally denoted by reference numeral 102, is rigidly mounted to the output shaft 70 of the indexer 26. The transfer arm assembly 102 comprises a mounting collar 104 keyed to output shaft 70, a mounting plate 106 securely affixed to the mounting collar 104, and four outwardly extending transfer arms 108. Each arm 108 is equally spaced at 90 degree intervals around the mounting plate 106 and affixed thereto by fasteners 110. Each transfer arm 108 terminates at its outer end in a U-shaped, hand-like gripper portion 112 having a pair of spring-urged retention elements 114. The grippers 112 and elements 114 cooperate to grasp a workpiece 116 during its transfer (see FIG. 8). As will be obvious to those skilled in the art, the transfer arm gripper portions 112 and retention elements 114 can be replaced, as a particular assembly situation might dictate, with other well-known forms of so-called pick and place devices such as mechanical, hydraulic, compressed air, magnetic, or vacuum-actuated pick-up units.

The transfer arm assembly 102 is rotatably indexed in 90 degree segments (clockwise as seen in FIG. 2) by the action of the output shaft 70 of indexer 26. It will be remembered that the main input shaft 36 rotates clockwise (FIGS. 2, 4) at a constant speed. Further, the shaft 36 drives the indexer 26 even while the latter is being horizontally rotated (both in counterclockwise and clockwise directions, see arrows in FIG. 4) relative to the oscillator 28. Thus, when the direction of rotation of the entire indexer unit 26 is the same as that of the main drive shaft 36, the respective speeds of rotation are additive. Without any form of compensation, this could result in an increased indexing speed for transfer arm assembly 102. However, when their respective directions of rotation are opposed, the respective speeds of rotation are subtractive which could result in a decreased indexing speed. Thus, the cam unit (not shown) utilized in the indexer 26 must be so designed, by using well known cam design methods, as to compensate for the above-described additive and subtractive rotational speed problem of the indexer 26 vis-a-vis the main shaft 36. Through proper cam design, the rotational output of the indexer 26, and hence arm assembly 102, can be rendered uniform throughout all portions of an operating cycle. This is so irregardless of the fact that the indexer itself is rotatably oscillating about shaft 36, rather than being mounted in a stationary fashion as is the typical mounting method for such cam-actuated mechanisms. This rotational speed compensating problem could alternately but less desirably be accomplished, through use of well known methods, by using a compensating mechanical linkage assembly mounted externally of the spacer housing 48.

It will be understood that the adapter unit 27 joining the indexer drive 26 to oscillator drive 28 may not be needed in certain assembly installations where phase or stroke adjustments are not a problem. For instance, the adaptor unit 27 and oscillator linkage assembly 72 could be replaced by mounting a rotatable mounting plate similar to mounting plate 52, but in the form of a sector of an internal ring gear and having appropriate bearings, directly atop the oscillator 28. Then the indexer unit could be affixed to the modified mounting plate, while a spur gear keyed to the oscillator output shaft 44 could drivably oscillate the ring gear sector of the modified mounting plate, and thus the indexer 26. The main drive shaft 36 would still drive the indexer 26 as in the preferred embodiment. Some adjustment could be obtained by having the spur gear pinned to output shaft 44 through any one of a number of angularly offset adjustment holes.

Turning now to a description of the operation of transfer apparatus 20, as seen in FIG. 3 which for purposes of this description illustrates the starting or "pick-up" portion of an operating cycle, the action of main drive shaft 36 has caused the output shaft 44 of oscillator 28 to rotate to its most clockwise position. This acts to similarly rotate, through the oscillator linkage assembly 72, the mounting plate 52 and indexer 26 to their respective most clockwise positions whereby the gripper 112a of the transfer arm 108a (see FIG. 2) has been located at work station A (FIG. 3) and is picking up the workpiece 116a off dial plate 22. (See the dotted line position for arm assembly 102 in FIG. 1, identified by reference letter "X".)

Further clockwise rotation of main shaft 36 causes the oscillator output shaft 44 to change direction of rotation and begin to oscillate the linkage assembly 72, plate 52, and indexer 26 and so that they approach the positions shown in FIG. 4. The new, solid-line position for arm assembly 102 in FIG. 1 is identified by reference letter "Y". As seen in FIGS. 2 and 4, such further rotation of shaft 36 causes the now partially-rotated indexer 26 to index i.e., vertically rotate, the transfer arm assembly 102. This has the effect of allowing transfer arm 108a to pick up and vertically raise workpiece 116a off dial plate 22 and to begin to rotate the empty transfer arm 108b towards its pickup position adjacent the next consecutive workpiece 116b. Arm 108b will engage workpiece 116b once dial plate 22 rotates clockwise (FIG. 3) to move piece 116b into position and once the apparatus 20 rotates back towards dial plate 22. It will be remembered that during one horizontal transfer movement through angle γ by oscillator 28, from work station A towards B, the transfer arm assembly 102 only rotates 90 degrees. This further rotation of the arm assembly 102 is depicted in FIGS. 2 and 4, wherein the arm assembly 102 has rotated approximately 45 degrees clockwise from the position depicted in FIG. 3. This rotation of arm assembly 102 begins the 180 degree turnover action of workpiece 116a, accomplished in two 90 degree segments, such that when the workpiece 116a is finally transferred to conveyor track 24, it has been inverted (see FIG. 2).

Continued further rotation of shaft 36 causes the oscillator output shaft to complete its counterclockwise rotation of linkage 72, plate 52, and indexer 26 whereat, those components reach their respective most counterclockwise positions as depicted in FIG. 5. There it is seen that the transfer arm 108d has placed a now inverted workpiece 116d in work station B. The arm assembly 102 has been moved to the dotted-line position identified by reference letter "Z" in FIG. 1. It will be understood that the inverted workpiece 116d is the workpiece picked up from plate 22 just prior to workpiece 116a.

Still further rotation of constant speed output shaft 36 will cause the oscillator output shaft 44 to again change direction of rotation and begin to oscillate assembly 72, plate 52, and indexer 26 in a clockwise direction. This rotation continues until the end of the full swing through angle γ back to the position of those components as shown in FIG. 3, or back to position "X" in FIG. 1 for arm assembly 102. It will be understood that during the just described return swing of apparatus 20, from work station B to A, the transfer arm assembly 102 does not index. This is because the cam (not shown) of indexer 26 is preferably designed using well known methods to present a dwell portion during this portion of an operating cycle. Accordingly, continued rotation of shaft 36 does not cause any rotational indexing of arm assembly 102 until a new workpiece has been picked up at station A and a reversal of direction of oscillator output shaft 44 (back to a counterclockwise direction) starts a new cycle of operation. Accordingly, a piece part picked up at station A is not completely transferred to station B until the second horizontal swing to station B is accomplished, and that part has undergone two consecutive 90 degree rotations.

Because various assembly setups differ in the distance between work stations or because of change in workpiece dimensions, the effective stroke or length of operation of a transfer arm assembly 102 must be adjustable depending on the conditions present. Also, the phase of the horizontal oscillation produced on plate 52 and indexer 26 must be adjustable to accommodate various assembly setups. These adjustments are made capable through adjustments to the oscillator linkage assembly 72 (see FIG. 6). The stroke of transfer arm assembly 102, i.e., effective distance between work stations A and B can be adjusted as needed by loosening fasteners 88 and sliding link bracket 86 along slots 84 until the desired position of bracket 86 is established. This stroke adjustment shortens or lengthens the effective distance between oscillator link arm 80 and pivot block 94. In effect, this changes the reference angle γ to say five degrees more or less of rotation, for example, and thus extends or shortens the actual stroke of transfer arm assembly 102. Any additional change in stroke can, of course, be provided by changing the length of each transfer arm 108. The phase of apparatus 20 can be adjusted by adjusting the stop members 98 to move finger 76 on pilot member 74 closer to one or the other of wing members 100 on link arm 80. This adjustment has the effect of allowing the γ degrees of horizontal oscillation of indexer 26 to start sooner or later, as desired. This would be done to place transfer apparatus 20 in phase with the movements of dial plate 22 and conveyor 24.

It will be understood that the specific cams (not shown) used in oscillators drives 28 and in indexer 26 must be so designed using well known methods as to produce near zero speeds for transfer arms 108 at their "pick-up" and "place" positions. This is necessary to reduce the possibility of damage to delicate workpieces. The majority of the rotational indexing movement for transfer arm assembly 102 would be made to occur at a very rapid rate during the midpoint of the 90 degree movement it undergoes.

It will also be understood that the transfer apparatus 20 of the present invention can be utilized in different assembly setups than that depicted in FIG. 1. For instance, the apparatus 20 could operate between two assembly dial plates, or between two conveyor tracks, or two parts feeding chutes, or various other type work stations, or a combination of any of these.

An alternate embodiment of the present invention referred to generally by reference numeral 118, is depicted in FIG. 9. Instead of utilizing a parallel shaft type oscillator, such as oscillator device 28 in the preferred embodiment, this alternate embodiment has a right angle or so-called gear oscillator device 120. Oscillator 120 has an oscillating side output shaft 122 operating at right angles to input shaft 36. A mounting collar 124 is keyed to output shaft 122 and carries an upwardly extending oscillator lever 126 which terminates in a roller 128 rotatably mounted thereto. The adjustment linkage assembly 72 of the preferred embodiment is, in this alternate form, replaced with yoke 130 securely fastened to the mounting plate 52 and so positioned as to accept the roller 128 of oscillator lever 126. The remaining components of this alternate embodiment 118 are the same as in the preferred embodiment.

In operation, the lever 126 of this alternate form 118 is caused to oscillate between its extreme edge positions (shown in outline in FIG. 9) by output shaft 124. This oscillation is, in turn, transmitted by roller 128 to yoke 130 and to the mounting plate 52 to which it is attached. The end result is that indexer 26 mounted to plate 52 undergoes the same degree of oscillation (angle γ) as that produced by parallel shaft oscillator 28 and linkage assembly 72. Adjustments in the operation of transfer arm assembly 102 can be effected by changing the location of yoke 130 on plate 52, or by changing the position of collar 124 on shaft 122, or by changing the diameter of roller 128.

It will thus be seen that the cam-actuated turnover and transfer placing apparatus of the present invention is an improvement over the structurally complex and much larger devices of the prior art. Through the use of a single input shaft to jointly drive an oscillator drive and a rotatable indexer drive, the present transfer apparatus has a minumum of parts and is structurally compact. Through the use of an indexer that is controllably oscillated to be in close proximity to respective work stations, the transfer arms on the turret-type transfer arm assembly can be of reduced length compared to prior art devices. This results in reduced momentum forces created on the transferred workpieces thereby allowing increased transfer speeds, all without fear of damage to delicate workpieces. Also, due to the use of pre-loaded box cams for the oscillator and indexer devices, increased accuracy is obtained over prior art devices. Moreover, use of such enclosed cam devices allows for increased and determinable life spans due to lack of wear from external contamination, unlike the exposed cam and linkage arrangement of the prior art devices.

From the foregoing, it is believed that those skilled in the art will readily appreciate the unique features and advantages of the present invention over previous types of parts handling and assembly transfer devices. Further, it is to be understood that while the present invention has been described in relation to particular and alternate embodiments as set forth in the accompanying drawings and as above described, the same nevertheless are susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. In a workpiece handling apparatus for inverting a workpiece while transferring the same between adjacent work stations, the combination of:

oscillator drive means having an oscillating output shaft;

indexer drive means having a base frame and an output shaft and characterized as having said base frame rotatably mounted on said oscillator drive means;

motor-driven drive shaft means operatively associated with both said oscillator and indexer drive means, and providing rotational input to both said drive means;

means connecting said output shaft of said oscillator drive means to said base frame of said rotatably-mounted indexer drive means, whereby said oscillator drive means controllably oscillates said indexer drive means between positions in close proximity to adjacent work stations; and a transfer arm assembly having multiple transfer arm members, said assembly connected to the output shaft of said indexer drive means and controllably indexed through rotational segments thereby, each of said transfer arm members characterized as being operable, when both said indexer drive means and transfer arm assembly are oscillated by said oscillator drive means and when said transfer arm assembly is rotatably indexed by said indexer drive means, to pick up a workpiece at a first work station, and to invert the same before transferring and placing it at a second work station.

2. The invention of claim 1, and wherein said means connecting said output shaft of said oscillator drive means to said base frame of said indexer drive means comprises a housing means mounted on said oscillator drive means, a mounting plate means rotatably journalled on said housing means and adapted to carry said indexer drive means, and oscillator linkgage assembly means connecting said output shaft of said oscillator drive means to said rotatable mounting plate means.

3. The invention of claim 2, and wherein said oscillator linkage assembly means has adjustment means for establishing the correct phase and stroke of the workpiece handling apparatus.

4. The invention of claim 1, and wherein said oscillator drive means is an enclosed cam-actuated mechanism having an output shaft operating in parallel alignment to said drive shaft means.

5. The invention of claim 1, and wherein said indexer drive means is an enclosed cam-actuated mechanism having an output shaft operating at right angles to said drive shaft means.

6. The invention of claim 1, and wherein said motor-driven drive shaft means comprises multiple segments coupled together.

7. A parts handling apparatus capable of horizontally transferring and simultaneously vertically inverting a piece part, comprising in combination:

power-driven drive shaft means;

first drive means drivably engageable with said drive shaft means and operable, when driven thereby, to oscillate a first output means;

second drive means drivably engageable with said drive shaft means and operable, when driven thereby, to rotatably index a second output means, said second output means characterized as operating in a plane perpendicular to the plane of operation of said first output means;

means connecting said oscillating first output means to said second drive means, whereby said second drive means is both drivably oscillated by said first output means and rotatably driven by said drive shaft means; and a multiple segment transfer arm assembly mounted on said indexed second output means and characterized as operable to pick up and place individual piece parts at adjacent work stations and to invert the piece parts during transfer between the work stations.

8. Apparatus for transferring workpieces between work stations, comprising in combination:

a motor-driven drive shaft characterized as providing a unidirectional, constantly rotating input;

drive means having a rotatably indexed output means, said indexed output means characterized as being oscillated about an axis normal to the axis of indexing, said drive means comprising an oscillator means and an indexer means drivably connected thereto, both said oscillator means and indexer means characterized as being directly driven by said drive shaft; and transfer means having a plurality of transfer arm members, said transfer means mounted on said oscillated and indexed output means and characterized as operable to effect the pickup, transfer, and placement of respective workpieces at adjacent work stations while effecting inversion of the workpieces during the transfer between work stations.

9. A workpiece transfer apparatus for transferring workpieces between adjacent work stations, comprising in combination:

motor-driven main shaft means characterized as providing a unidirectional, constantly rotating input;

first drive means directly driven by said main shaft means and having an output shaft means oscillating through a preselected degree of rotation;

second drive means directly driven by said main shaft means and having output shaft means rotatably indexing through desired segments of rotation, said second drive means characterized as being rotatably mounted on said first drive means;

means connecting said oscillating output means of said first drive means to said rotatably mounted second drive means thereby to controllably oscillate the latter;

transfer arm assembly means engaging said indexed output shaft means of said second drive means and characterized as having a plurality of transfer arm members each operable to pick up, transfer, and place a workpiece.

* * * * *

UNITED STATES PATENT AND TRADEMARK OFFICE
CERTIFICATE OF CORRECTION

PATENT NO. : 4,260,324
DATED : April 7, 1981
INVENTOR(S) : VanderGraaf, Max & Mang, Joseph It is certified that error appears in the above—identified patent and that said Letters Patent is hereby corrected as shown below:

Patent issued under inaccurate name "Max V. Graaf" should be --Max Vander Graaf --.

Under Other Publications "3,951,271" should be listed under U.S. Patent Documents Column 7, line 63, after "so-called" insert --roller--

Column 8, line 36, after "pre-loaded" insert --enclosed--

Signed and Sealed this

Twenty-eighth Day of July 1981

[SEAL]

Attest:

GERALD J. MOSSINGHOFF

Attesting Officer

Commissioner of Patents and Trademarks